July 11, 1944.  D. GARDNER  2,353,614
ELECTRIC FURNACE
Filed April 4, 1942   2 Sheets-Sheet 2
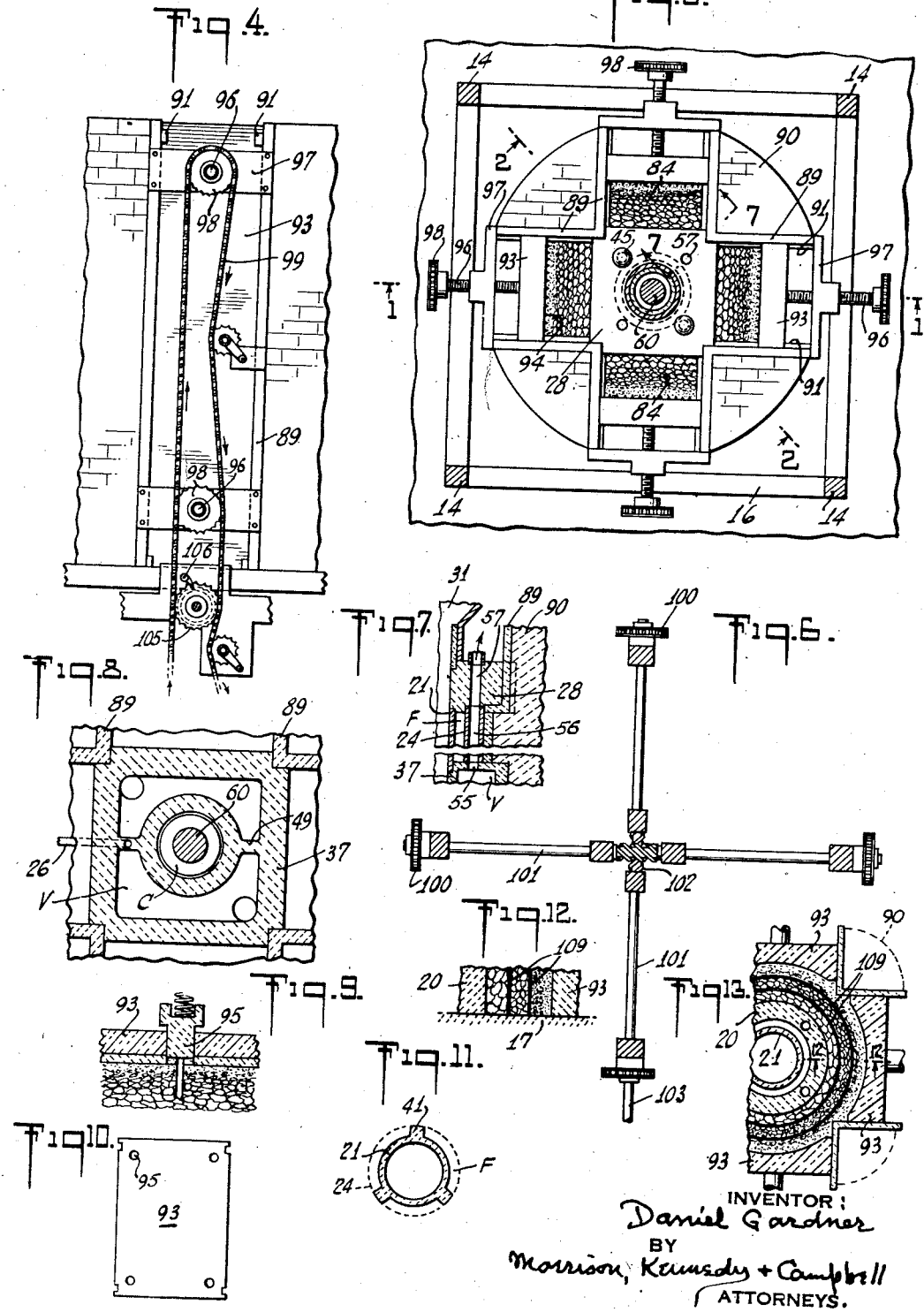

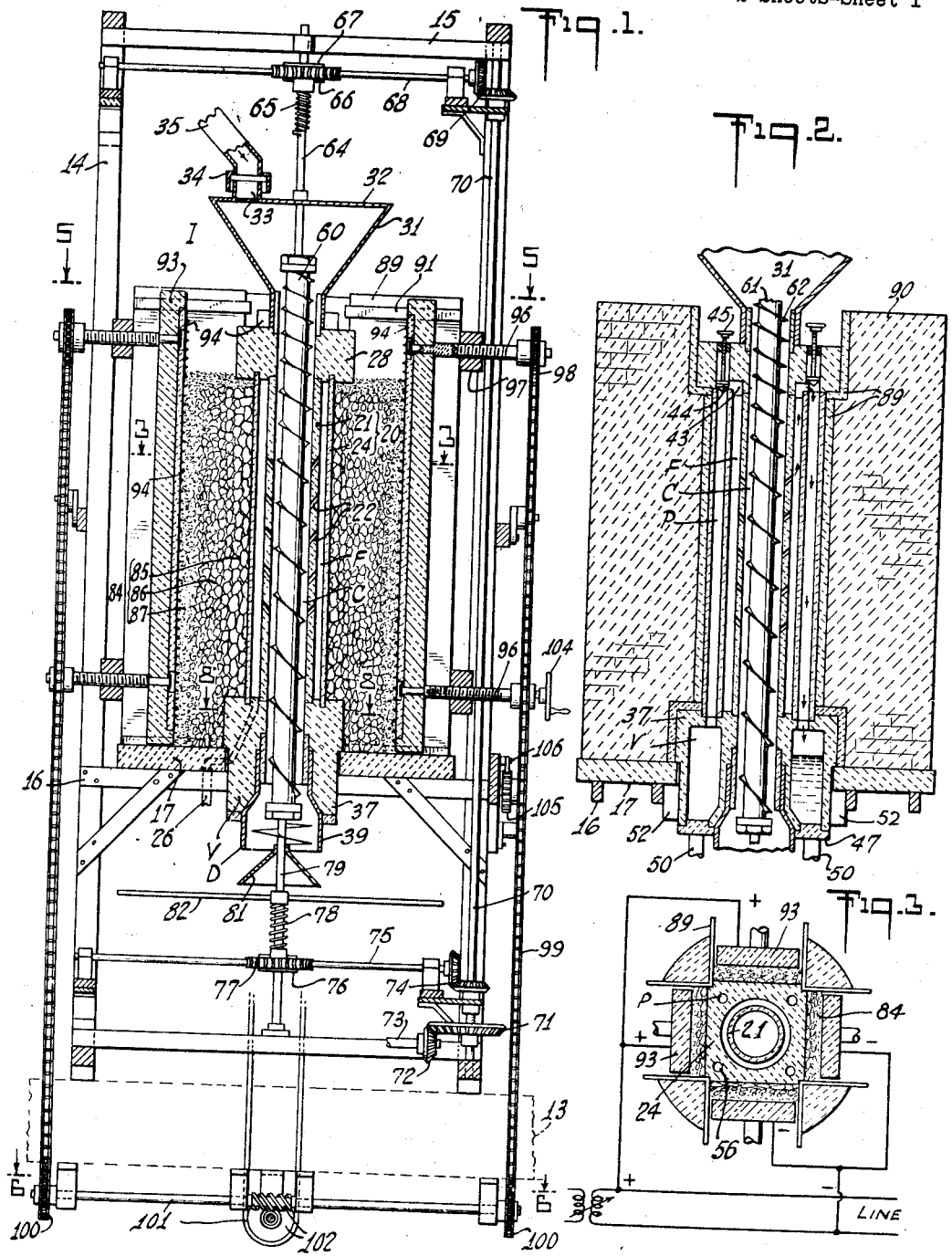

Patented July 11, 1944

2,353,614

UNITED STATES PATENT OFFICE 2,353,614

ELECTRIC FURNACE

Daniel Gardner, New York, N. Y., assignor to Gardner Thermal Corporation, a corporation of Delaware Application April 4, 1942, Serial No. 437,633

10 Claims. (Cl. 13—8)

This invention relates to electric furnaces of the kind adapted to carry out chemical, metallurgical or heat treatment operations, typically for the industrial treatment of solid substances or mixtures such as the production of metals from their ores; a typical instance being the recovery of magnesium from crushed ores or raw materials, which may be with continuous treatment, and is preferably with distillation of the desired metal from the substances advancing through the furnace, although in some cases, as tin, the metal in molten form may be trickled down through the slag in the chamber and recovered without vaporization.

An example of a furnace of the kind referred to is that illustrated in Gardner Patent No. 2,195,453, granted April 2, 1940, with which the illustrated embodiment of the present invention has a number of features in common. Thus both in said patent and this application there is a refractory-walled tubular reaction chamber, preferably extending downwardly from infeed to discharge of the solid substances; the chamber wall being hollow to provide a longitudinal flue reached by perforations in the inner face of the wall; the entire apparatus, from infeed through discharge being constructed and arranged to prevent leakage, as of air, into the chamber. To progress or convey the advancing substances an interior refractory mechanical feed device or rotatable screw is provided, unless gravity can be relied upon, with its speed and action coordinated with the reactions to be performed in the chamber and the duration thereof under given temperature conditions. Surrounding the chamber wall is a body or aggregation of electric-resistance heating material, in heating relation to the wall, so that by the passage of suitable current the resistance generates much heat energy, preferably supplemented by the heat due to arcs extending between particles or granules of the heating material, whereby high temperatures are produced which find their way into the chamber by conduction, convection and radiation, the temperatures being adequate to the purpose in hand, such as the vaporizing of metals to be extracted from the advancing mass of solids. The heating material is preferably subdivided or granular, composed of carbon particles or the like, confined between the reaction chamber wall and an outer closure, and being preferably graded, with the coarser granules adjacent to the chamber wall, and only fine particles adjacent to the outer closure, affording heat insulation therefor. The gases passing from the chamber into the wall flue may then be conducted through an extension passage to a place of disposal, as a condensing vessel. Although the present invention is shown embodied in a furnace possessing all of these characteristics, certain features of the invention may be usefully employed with other kinds of furnaces.

In this specification the terms gas and vapor are used interchangeably, unless where specified to the contrary; and temperatures are given according to the centigrade system.

Among the general objects of the invention are improvement in efficiency and economy of operation, with relatively low current consumption; also convenience and safety of operation of the furnace. A further object is to afford an effective means of control of the resistance and arc heating operation, with closer and steadier regulation of operative temperatures and the resulting reactions in the chamber. A further object is to afford a practical electric furnace which can be maintained in continuous operation, without the need of shutting off the operation for renewals or the like, which might seriously set back the progress of the prearranged reactions in the chamber. Other objects and advantages of the invention will be pointed out in the hereinafter following description of an illustrative embodiment of the invention or will be understood by those conversant with the subject of electric furnaces.

To the attainment of such objects and advantages the present invention consists in the novel electric furnace and the novel features of operation, combination, construction arrangement and detail herein illustrated or described.

In the accompanying drawings, Fig. 1 is a vertical central cross section of an electric furnace embodying the present invention, taken substantially on the section line 1—1 of Fig. 5.

Fig. 2 is a similar vertical section, but taken on the 45° section line 2—2 of Fig. 5, and with numerous general elements of the structure omitted.

Fig. 3 is a horizontal section view taken on the section line 3—3 of Fig. 1, this figure being somewhat diagrammatic and containing a typical arrangement of electric wiring.

Fig. 4 is a partial righthand elevation of the structure shown in Fig. 1.

Fig. 5 is a top plan view, being shown partly in section on the section line 5—5 of Fig. 1.

Fig. 6 is a top view of certain parts of the operating connections, located beneath the furnace, taken partly in section on the section line 6—6 of Fig. 1.

Fig. 7 is a vertical section view of a detail, taken on the section line 7—7 of Fig. 5.

Fig. 8, looking from above, is a horizontal section view of certain parts at the lower end of the furnace, taken on the section line 8—8 of Fig. 1.

Fig. 9 is a section view taken through one of the studs of Fig. 10, and Fig. 10 is an elevation view, these illustrating a modification in the construction of the pressure members or platens within which the heating material is enclosed.

Fig. 11 in horizontal section shows a modified structure of tubular parts constituting the reaction chamber wall.

Figs. 12 and 13 duplicate part of Figs. 1 and 3 with modifications introduced.

Referring first to the general features of the embodiment illustrated in the drawings, at the heart of the apparatus is provided a walled reaction chamber C, which is shown of tubular form to accommodate progressive advance of the substances and is generally closed except for the arrangements necessary at the infeed I and discharge D of the furnace, so as to exclude the entrance of air or other gases and to prevent leakage of gases produced within the chamber. The chamber is provided by a hollow wall, the interspace within which constitutes a longitudinal flue F, in the illustrated case this being an uptake, receiving gases from the chamber interior and conducting them away, for example through an extension or passage P which may lead to a suitable place of disposal, such as a vessel V wherein metallic or other vapors may be condensed.

The entire furnace may be solidly mounted, for example on floor beams 13, above which extends a vertical frame comprising, among other parts, corner uprights 14 and top cross pieces 15. Upon braced cross pieces 16 is supported a base 17, which is centrally apertured to receive the condensing vessel to be described and constitutes the support for the furnace. This base 17 may be a circular slab formed with a central square hole through which the condenser or lower block or head of the chamber to be described may depend, with shoulders to support the block, and with clearance between them to allow for heat expansion and contraction.

The reaction chamber wall 20 is preferably, for structural purposes, composed of an inner wall part or circular tube 21 having perforations 22 and a separate outer wall part 24, the two enclosing between them the flue F and the outer part being preferably polygonal or square as shown. In case it is desired to introduce hydrogen, helium or other gas into the flue F, as in said patent, an intake passage or pipe 26 may be provided, leading for example through the base slab 17 and thence through part of the lower chamber block 37 to be described; or by any other convenient path.

The parts at the upper end of the tubular reaction chamber include what may be termed a top block 28, shown of square form and having underneath grooves to receive the top ends of the tubes 21 and 24 of the chamber. This block is held fixedly in central position by engagement with other fixed parts to be described. The block 28 is centrally apertured by a circular conduit constituting a continuation of the reaction chamber C, and in effect constitutes the entrance portion of the chamber. Connected to the upper side of the block is shown an infeed hopper 31 with a closing cover or disk 32 having a flanged inlet hole 33, shown closed by a cap 34. As a means of infeeding crushed substances to the hopper the cap itself is apertured and connected to a feed pipe 35. This feed pipe may have a flexible pipe extension leading from a source of the substance to be treated and by its flexibility permitting it to be applied to and removed from the hopper. It should be stated that before feeding crushed or ground material into the infeed hopper and furnace it is desirable to put the substance through a treatment for removing from it any fine dust which is likely, during reactions, to be drawn out of the chamber along with the gases and thus by way of the flue to the eventual point of disposal and to the impairment of the desired final steps of the reaction. Coarse particles also should be screened out.

At the lower end of the chamber C its tubular parts 21 and 24 are accommodated in grooves formed at the upper side of a bottom block 37 which is centrally arranged and which as will be described is preferably of hollow construction to constitute a receiving or condensing vessel. As already described the block 37 is formed with a shoulder by which it rests upon the central portion of the annular base slab 17, while the lower part of the block or condenser extends through into underneath access for purposes yet to be described. The lower block 37, like the upper block 28, contains a central passage or conduit constituting a downward continuation of the chamber C, and at the lower end thereof is indicated a flared cylindrical wall, providing the discharge extension 39 of the chamber. Below this point are certain delivery devices similar to those shown in said patent, as will be subsequently described.

In order to space concentrically the inner tube or section 21 within the cylindrical space in the outer tube 24, instead of relying upon the grooves in the upper and lower chamber blocks or heads 28 and 37, one or another of the two tubes may be provided with protuberances 41, for example on the outside of the inner tube, as shown in the Fig. 11 modification. Such lugs 41 may be intermittent or continuous and are arranged substantially to reach across the flue space F and contact the other tube, which not merely assists to space and centralize the parts but aids in the flow of heat through the chamber wall into the substance or mixture advancing within, so that the heat may be transmitted inwardly by conduction as well as by convection and radiation.

The course of the gas flow from the chamber C through the flue F and to the vessel or condenser V will now be explained. The flue being preferably an uptake, there is shown at its top end a short cross port 43 leading directly to the top end of a downtake passage P. For a duplex action there are preferably two such downtakes, as best shown in Figs. 2 and 5, with a cross port 43 to each of them. To permit certain selective control of operation it is desirable to be able to shut off one or the other of the downtake passages, and for this purpose each of them is shown as closable at its top end by a conical valve 44 having its stem extending up through the top block 28 to a screw-adjusting handle 45. Fig. 2 shows the lefthand valve closed, the other one open. As thus far described the gases and vapors generated in the reaction chamber C can pass through the numerous perforations 22 into the flue F, where they may be joined by a suitable additional gas furnished through the intake passage 26; all of these ascending the flue and thence passing through the ports into one or both of the downtake passages P, leading to opposite sides of the condenser V.

As already explained the lower annular block 37 is preferably formed hollow to constitute the condenser, and the two passages P deliver downwardly through the upper wall of the condenser into its interior space where condensed substances may be received or collected. The block or condenser 37 may be built up of refractory members, its lower end being shown closed by a ring 47. For selective purposes the condenser space is shown divided into two subcondensers by means of a vertical partition 49 best shown in Fig. 8. In order to draw condensed substances, such as molten metal, from the twin vessels respectively, there is shown for each of them a descending pipe or tap 50; and the substance may be drawn alternately from these and conducted to suitable molds, the entire operation being protected from admission of air or oxygen; any known means of opening and closing the taps for the purpose being understood. Manifestly the temperature within the condenser must be carefully, though not critically, predetermined; for example in the lower part of the vessel the temperature must be at least low enough to condense the downcoming vapors, as of magnesium, whereas at the point where the downtakes deliver into the condenser the temperature should remain above the vaporization point of the metal, in order to prevent premature condensation. On the other hand, at the lower part of the vessel, the temperature must be safely high enough to prevent solidifying, and to permit the condensed material to be run off in liquid condition. In order to permit adjustment of conditions for these purposes, the condenser is shown as extending down below the base slab 17, thus exposing the lower part of the condenser; and surrounding this exposed portion is shown an annular means 52 which, according to the needs, may either be a cooling means employing a circulating medium to cool the condenser and insure condensation; or an insulating means to preserve the condenser against undue cooling; or a supplemental heating means to insure fluidity of the condensed substance.

Thus, as a feature of improvement, the condenser vessel V is adjacent to the hot reaction chamber C, and at least partially within the furnace, preferably annularly surrounding the discharge; while the extension passage P, from C to V, is located in a hot place, in this case formed directly in the refractory outer wall tube 24 of the chamber wall, at a corner of its square outline, as seen in Figs. 2 and 5. Thereby metals under distillation are kept safely vaporous until reaching the condensation vessel, where they become liquid, to be tapped off continuously or intermittently as desired, or in the case of twin vessels, alternately; the outlet not being tapped being closed off in any practical way as by a shiftable gate, composed of a more refractory metal or material, as tungsten, exteriorly operated without danger of admitting air into access to the molten metal.

The metal vapor and liquid flow from reaction chamber to casting mold should be, to prevent combining or oxidizing, continuously closed and sealed against air infiltration; so that from infeeding of ore to solidifying of ingots the apparatus and actions are unitary in the sense of being consecutively cooperative.

It is necessary to relieve the condenser, at each side of its partition, as to the gases received through the downtake P that do not become condensed in the vessel; and for this purpose each compartment of the vessel, near its upper portion is provided with a vent or gas outlet 55, as best seen in Fig. 7. This vent, or these vents, may be considered as the final gas outlets of the furnace, and they may lead to any desired place of reception or disposal, the outflow being promoted by forced or induced draft means if desirable. In Fig. 7 the condenser outlet 55 is shown as leading into an uptake passage 56 formed near a corner of the square outer chamber wall or tube 24, as shown also in Fig. 3. This uptake 56 is shown as extending the full height of the chamber and delivering thence into an extension passage 57 provided in the upper chamber head block 28, as indicated also in Fig. 5. Above the outlet of the passage 57 may naturally be any desired extension or pipe, which may be discharged to outdoor atmosphere if the gases are to be wasted. Or these hot gases may be flowed in a manner to recover usefully the otherwise wasted heat; and in any case the described venting connections may be provided with a conventional trap or check means preventing possible back flow of air into the condenser. Instead of venting the hot gases vertically upward from the condenser, as shown and described, they may be otherwise taken off from the upper part of the condenser, for example, the venting connections may leave the condenser laterally; thus in Fig. 2 the venting port might lead outwardly into an outflow passage extending through the refractory brickwork 90 to be described, thus obviating the need of providing waste gas uptake passages 56 and 57 in the furnace members 24 and 28 respectively.

In order to cause or insure the steady or regular feed or advance of the crushed ore or other substance through the reaction chamber C it is preferred not to rely upon gravity but to provide a mechanical feed device, shown as a rotatable screw 60, of refractory material, occupying the interior space of the chamber. An upright furnace being shown the feed device cooperates with gravity in the orderly travel of the solid substance or mixture through the furnace. The feed screw 60 is shown as composed of a stem or core 61 carrying a system of feed ribs or a screw thread 62; and preferably, as shown, the core is of relatively large diameter so as to provide a relatively thin annular feed path for the substance, so as to insure rapid, thorough and uniform heating thereof, the screw core quickly acquiring the necessary high temperature to cooperate with the hot inner wall or tube 21 of the chamber. The feeding thread or rib of the feed device is shown as substantially reaching to the chamber wall, but with preferably a slight clearance to allow for expansion and to prevent scraping. The feed screw need not have uniform pitch of thread, which on the contrary may be varied along the longitudinal length of the furnace to coordinate the advance with any changes of volume of advancing substances; for example the screw is shown as having its pitch progressively increased toward the discharge or lower end, thus tending to accelerate the speed of advance and minimize the danger of clogging.

The feed screw may have a continuous rate of rotation, or the rotation may be with quick intermittent steps to improve the action and prevent any tendency of the substance to rotate with the screw; and the rate or speed of rotation may be effected in a controllable manner, as by the following driving connections which, as in said patent, may act upon both ends of the feed screw, and with cushioning means to minimize shock and breakage. At its top end the screw 60 is shown secured to a rotary spindle 64 which is operatively connected through a cushioning spring 65 with a worm wheel 66 rotated slowly by a worm 67 mounted on a cross shaft 68, which in turn is connected by bevel gears 69 with a longitudinal or upright shaft 70, at a convenient point of which, shown at the lower end, is a large bevel gear 71 meshing with a small bevel gear 72 on a driving or power shaft 73 which may for example be motor driven by a speed-regulable electric motor. The connections to the other or lower end of the feed screw may comprise a pair of bevel gears 74 mounted respectively on the upright shaft 70 and a cross shaft 75, which in turn carries a worm 76 driving a worm wheel 77 which is connected through cushion spring 78 with a spindle 79 to which the lower end of the feed screw is secured. The rate of screw rotation and feed action may be controlled by the operation of the power shaft 73 or any conventional speed regulating means, whereby the solids advancing through the furnace may be given a predetermined speed coordinated with the reactions to be performed; so that each successive portion of the solids may be subjected to a period or duration of treatment determined, in the case of any given treated substance, by the character of the reaction to be effected and the reaction temperature, the duration of treatment naturally being a function of the combined factors, the longitudinal length of the reaction chamber or its hot zone, and the mean speed of travel therethrough.

In connection with the discharge of solid substances through the fixed discharge extension 38 of the furnace, the spindle 79 may carry auxiliary delivery devices, such as shown in said patent, including a conical screen 81 fast on the spindle 79 and below that a rotary table 82; which devices may have a classifying action upon the discharged solid residues.

Reference has been made to the electric-resistance-heating material 84 which surrounds the reaction chamber outer wall 24. While this body of material might be of unitary or compacted character it is preferably in loose or granular form, these terms being intended to cover and include the resistance material in any suitable subdivided form, whether true granules, or flakes, or other form, and whether crushed or ground or otherwise prepared. As in said patent, and herein illustrated, this granular resistance material is preferably graded in its arrangement; and the substantially annular body of material 84 is illustrated as comprising relatively coarse particles forming a layer 85, most nearly adjacent to the reaction chamber wall, with other layers 86 of lesser size of granule, and an outer layer or stratum 87 which may be so extremely fine as to afford an insulating function protective of the outer enclosing parts to be described. The stratification of the aggregation of granules may comprise three strata besides the outer insulating layer; and these strata may have segregating sheets between them as further described.

The outer enclosing parts of the body of granular resistance material are shown as comprising certain fixed parts or plates 89 and certain adjustable or pressure members or platens 93, both of refractory material, and the latter of which might be of the nature of bendable diaphragms, but are preferably slidable platens or pressers guided by the fixed plates 89. Thus, in the illustrative embodiment the fixed or guiding parts of the outer enclosure comprise four pairs of plates 89, which may be furnished in the form of four angle plates, outwardly of which, within the angles thereof, is preferably a built-up system of refractory and insulating firebricks 90, reinforcing the furnace structure and minimizing heat losses by outward conduction. The fixed guiding plates 89 are seen to be arranged in radial pairs, spaced apart, and at their facing sides are provided with guiding ribs 91 engaged by the inwardly and outwardly movable presser members or platens 93, each of which pressers may have a special facing 94, as of ribbed character, for improved engagement with the granular or pulverized material within, and better electric conduction between the two. In order further to improve the electric contact between each slidable platen and the resistance material within, the platen may be constructed as shown in Figs. 9 and 10, namely with a series of apertures in which can play spring pressed studs or pencils 95, providing a greater intensity of contact pressure at these points than may prevail over the face of the adjustable platen. For example, each stud 95 may extend inwardly as a spur, through the insulating layer and into the next inward layer of granular material; this helping to bring the energizing current to the granules to be heated.

As a means for thrusting or adjusting inwardly in unison the several platens operating mechanism is disclosed which may be described as follows. Each platen has an operating spindle or screw 96, or preferably two or more such spindles, operatively connected to the platen, for example one above the other, so that when the spindles are rotated the platen is caused to thrust inwardly or relax outwardly in relation to the body of resistance material. For these purposes each screw spindle is shown threaded through a bridge piece 97, extending across from guide plate to guide plate and acting as a nut. There being shown four platens, with two screw spindles for each, there is a total of eight such spindles illustrated, and for turning all of these in unison they are provided at their outer ends with sprocket wheels 98 driven by sprocket chains 99, from a single source of operation. A convenient arrangement is that each of the four sprocket chains, engaging the two sprocket wheels of a single platen, extends downwardly in order to interconnect the two sprocket wheels, and further downwardly for common connection. Thus each sprocket chain at its lower end passes around a sprocket wheel 100. The four lower sprocket wheels are shown mounted in pairs on horizontal drive shafts 101. For example, the two shafts may extend at right angles to each other, one slightly below the other, and the two geared together by a pair of helical gears 102, having 45° threads to secure identical rotary speeds throughout the mechanism under description, which is best shown in Figs. 1, 4 and 6. One of the cross shafts 101 may have an extension 103 for the purposes of power operation if desired, since the threaded spindles 96 are preferably of low pitch and several turns may be required to effect a change in adjustment. On the other hand the operation may be performed manually, for which purpose a handwheel 104 is shown mounted on a convenient one of the spindles 96. In either case, when a desired platen adjustment has been secured, this may be retained by locking the adjusted parts, for example through a toothed locking wheel 105 engaged at will by a dog or pawl 106. The adjustment of the platens and the consequent resistance action and resulting temperature may be effected by trial in each case, or calibrations may be suitably arranged in order to set the mechanism for a given result without the need of trial operations.

The electrical arrangements may be various, but an illustrative arrangement is shown in Fig. 3 wherein an operating circuit is taken off of standard line wires, leading the current into an adjacent pair of pressure platens, and taking off similarly from the other pair. The current, which is of any usual kind, is thus caused to pass from certain of the platens through the resistance material, such as granules of carbon, and to some extent through the graphite material of the outer chamber wall 24, tending also to increase the heating effect. In the body of heating material 84 the heating action may be by a combination of resistance and arc heating.

While line wires are shown connected directly to the pressure panels, it may be necessary to transform a standard current, as of 220 volts, to the lower desired voltage, as 50 or 40 volts; and the supply conductors shown may be considered as leading from the transformer. As the cumulative heating effect brings the furnace temperature up to the desired operating point the voltage is gradually reduced, as to 15 or even 10 volts, this operating potential being suitably regulated to preserve steady reaction temperature. The operations may be performed with a relatively low current, and the furnace thus operated with low consumption of electrical energy, such as the approximate rate of 30 kilowatts per hour.

The dimensions of the furnace may be varied in accordance with the operations in hand, and the hot zone of the chamber C for example may have an internal diameter of about 10 to 12 inches, with a length of about 4 to 8 feet. Taking the case of recovery of magnesium from its ores, this may be effected with relatively low current consumption. The process to be followed may vary, and may for example be similar to the processes described in pending U. S. patents and applications of this applicant. The crushed or ground ore or raw substance should be predried to promote effective infeed. Also the substance should be treated to remove fine dust that might interfere with the reactions. The crushed substance is preferably passed through a screen, for example of about 45 mesh, before entering the infeed pipe 35 that delivers into the infeed hopper. In such case the reaction temperature may desirably be in the neighborhood of 1300°, which is well above the boiling point of magnesium; but for other metals it is found that a furnace on the principles hereof may readily provide a reaction temperature well above 3000°. The infeeding and discharging of solids may be substantially continuous, by reason of the interior feed device 60, advantageously assisted by gravity. With the metal-containing raw material are usually mixed other agents, and this mixture, under the temperature provided, yields the desired metal, and moreover vaporizes it, to pass through the perforations 22 into the flue F and thence by way of the passages P to the condensers V within the vessel 37.

Various elements of the described furnace have been stated to be composed of refractory materials. This naturally refers to high refractory properties, and applies to the following elements: The chamber wall 20 and its inner and outer tubular parts 21 and 24; the upper and lower chamber blocks 28 and 37; the interior feed device or rotary screw 60; and to a less extent the pressure platens 93 and the angle pieces or guides 89 surrounding the resistance heating material. For all of these purposes a suitable material of high refractory properties is graphite, which may be formed or machined to the shapes indicated. Tungsten carbide or other carbides or borides may be available, as well as certain refractory metal oxides, thoria and the like, known for this property. The refractory materials chosen must be such as do not tend to combine with the substances under reaction, and in all cases the refractory materials should be resistant not merely to high temperatures but to the corrosive or combining actions of the gases or agents present or used in the reactions.

As regards the movable or contractible enclosure means, surrounding the body of resistance materials and adapted to constrict it, this has been shown as comprising two opposite pairs of adjustable platens or panels, with guiding plates between each two. In principle however each one of these platens or enclosures afford desirable regulation of heating.

In assembling the apparatus the several panels or platens may first be retracted outwardly by the adjusting handle 104, and the granular resistance material then introduced from above, to a proper depth, being fed into place in successive or concentric layers, and preferably well tamped or compacted downwardly between the furnace chamber outer wall and the enclosing structure of platens and guide walls. When this operation has been completed the apparatus is in readiness to be energized by an electric current, for the treatment of the substances to be fed through the chamber, during which treatment the reaction temperature may be adjusted at will by operating the handwheel to move toward each other the several pressure platens, whether by sliding, swinging, or otherwise.

It is found that by thus altering the granule compression the rate of heat generation and therefore the operating temperature may be regulated. The compression of the aggregated granules forces them into more intimate contact and thus tends to increase conductivity between granules. There may be various reasons why this mechanical action alters the electric heating action, but it is believed that the following theory explains this means of regulation of the furnace. In at least some cases it appears to be true that by forcing inwardly the pressure panels, the resulting compression of the granules results in an increased generation of heat and conduction thereof to the reaction chamber. It is probably the case that the pressure between granules affords not merely better electric contact between them, but widens the areas of contact, so that, as regards current flow from granule to granule there is a reduction of resistance. With any prevailing voltage the result may be an increased current within the interior of each granule, and since each granule is a heat generator, the conversion of electrical into heat energy is enhanced. The sum of these heatings of all of the granules, acting cumulatively within the furnace, causes the delivery of a greater volume of heat to the outer wall of the chamber and thence through the wall to the substances within. In other words with increased panel pressure there is an increased intensity of heat produced, and vice versa; and another factor consists in the flattening of the innermost granules against the chamber wall, thus improving the heat conducting contact between them for the more efficient transmission into the wall and chamber.

It was above stated that in loading the furnace with heat resistant granules, the same may be stratified by first inserting sheets between the positions of the layers to segregate them, and then gradually filling the spaces between these concentric sheets and tamping the material during the operation. For this purpose segregating sheets may be employed consisting of paper or similar fabricated sheet material. A satisfactory material is ordinary corrugated packing paper, but preferably impregnated with some mineral to improve its resistance and strength. These separating sheets therefore serve the initial purpose of assisting in the building up of the granule body, which may be to the depth shown in Fig. 1, with a top level layer to help exclude the entrance of air from above.

In addition to their function during assembling, it is found that the paper separators 109, embedded in the heating material, afford another advantage, these papers not becoming destroyed but surviving for a substantial period after the material is under heat. Owing to this discovery it results that the strata are kept intact, and separated from each other indefinitely, which is of advantage in some cases. The results are improved by coating the separating paper or cardboard, for example with tar at its inner surface only, thus becoming somewhat conductive, while the outer side of the paper remains relatively non-conductive. This feature of improvement is of general utility, and may be used advantageously in the furnace, of said Patent No. 2,195,453 wherein there are sliding electrodes that protrude through a fixed outer wall and may be caused to extend through holes in the paper separators. This plan indeed may be available for resistance heating otherwise than for furnaces. See Figs. 12 and 13, the latter also showing a modified disposition of granular material between chamber and outer enclosure.

Various matters of structure, arrangement and operation may be supplemented in obvious ways for particular purposes; for example as in Figs. 9 to 12. The several adjustable panels or pressers are illustratively shown as rigid walls sliding or moving adjustably, acting substantially as diaphragms. The several panel operating means are illustratively shown connected for simultaneous equal actuation, each with its own actuator or sprocket wheel. In any case the change of internal compression tends to change conductivity and heat-generating action, thus providing the rule by which the adjustment, made at will or automatically, may control the temperature of reaction in the furnace chamber. Automatic control may be brought about responsively or thermostatically from the resulting temperatures.

There has thus been described an electric furnace embodying the principles and attaining the advantages of the present invention. Since many matters of operation, combination, construction, arrangement and detail may be variously modified without departing from the principles involved, it is not intended to limit the invention to such matters except to the extent set forth in the appended claims.

What is claimed is:

1. A high-temperature electric furnace for the continuous treatment of solid substances or mixtures, as for the extraction by distillation of metals from ores, compounds or mixtures; comprising a refractory-walled tubular reaction chamber arranged longitudinally for the progressive travel between infeed and discharge of the substance to be treated, and a body of electrical-resistance heating material surrounding the chamber wall in heating relation thereto, the chamber wall being exteriorly closed but formed with interspaces constituting a longitudinal gas flue and with perforations in its inner face for gas outflow from chamber to flue; together with an enclosure comprising at least one movable presser platen spaced outwardly from and facing the chamber wall with the body of heating material enclosed between wall and platen, and mechanical means to adjust transversely said platen towards or from said wall to apply variable squeezing compression and relaxation to the body of heating material, thereby to vary its electrical resistance and so to control the heating effect and reaction temperature.

2. The electric furnace as in claim 1 and wherein the enclosure comprises a plurality of movably adjustable platens and fixed enclosure parts which serve to support or guide the movable parts.

3. The electric furnace as in claim 1 and wherein are several movable platens and the adjusting means therefor consists of mechanism to move the several platens in unison toward and from the chamber.

4. The electric furnace as in claim 1 and wherein is a feeding device operable within the reaction chamber to convey progressively along the substance under treatment.

5. A high-temperature electric furnace for the continuous treatment of solid substances or mixtures; comprising a refractory-walled central tubular reaction chamber arranged longitudinally for the progressive travel between infeed and discharge of the substance to be treated, a longitudinally arranged outer enclosure spaced from the chamber wall, and a body of electrical-resistance heating material in the space between the enclosure and the chamber wall in heating relation to the wall, the chamber wall being exteriorly closed but formed with interspaces constituting a longitudinal vapor flue and with perforations in its inner face for gas outflow from chamber to flue; said enclosure comprising at least one movable presser platen facing the chamber wall with the heating material enclosed between wall and platen, means to adjust transversely said platen towards or from said wall to apply variable squeezing compression and relaxation to the body of heating material, thereby to vary its electrical resistance and so to control the heating effect and reaction temperature; a longitudinal vapor passage leading from said flue at a hot position exterior to the reaction chamber but interior to the body of heating material, and a condenser vessel to which said passage leads located to receive heat from the furnace.

6. An electric furnace as in claim 5 and wherein the vapor flue and the vapor passage are separate ducts both longitudinally formed in the chamber wall, the flue receiving vapors through the wall perforations and delivering into the passage for flow to the condenser.

7. An electric furnace as in claim 5 and wherein the condenser is subdivided into condenser compartments adapted to alternating use, with a separate vapor passage leading from the flue to each compartment, means for separately shutting off such passages to determine the alternate use of the compartments, and liquid taps and gas vents for the several compartments.

8. A high-temperature electric furnace for the continuous treatment of solid substances or mixtures, comprising a refractory-walled tubular reaction chamber arranged uprightly for the progressive downward travel from infeed to discharge of the substance to be treated, and a body of granular or loose electrical-resistance heating material surrounding the chamber wall in heating relation thereto, the chamber wall being exteriorly closed but formed with interspaces constituting an ascending vapor flue and with perforations in its inner face for gas outflow from chamber to flue; said chamber, infeed, discharge and flue being gas tight for the exclusion of air from the substances; an enclosure comprising at least one movable presser platen spaced outwardly from the chamber wall with the body of heating material between wall and platen, and means to adjust transversely said platen towards or from said wall to apply variable squeezing compression and relaxation to the body of heating material, thereby to vary its electrical resistance and so to control the heating effect and reaction temperature; a condenser vessel connected by a descending vapor passage from flue to condenser, said condenser being at the low end of the furnace and partially within the furnace enclosure above its base wall but partially depending therebelow to an exterior position wherein the vapor condensate is received.

9. An electric furnace as in claim 8 and wherein the condenser is annular and surrounds the discharge end of the reaction chamber.

10. An electric furnace as in claim 8 and wherein adjacent to the exposed lower part of the condenser is a wall enclosing a circulation space adapted to receive fluid to cool or warm the condenser as required for the operations therein.

DANIEL GARDNER.